(12) United States Patent
Araki et al.

(10) Patent No.: US 11,905,073 B2
(45) Date of Patent: Feb. 20, 2024

(54) CAP, MOLD AND MANUFACTURING METHOD OF CAP

(71) Applicant: Daiwa Can Company, Tokyo (JP)

(72) Inventors: Eiji Araki, Sagamihara (JP); Takashi Kawada, Sagamihara (JP); Kenji Takagi, Sagamihara (JP)

(73) Assignee: Daiwa Can Company (JP)

( * ) Notice: Subject to any disclaimer, the term of this patent is extended or adjusted under 35 U.S.C. 154(b) by 585 days.

(21) Appl. No.: 16/823,551

(22) Filed: Mar. 19, 2020

(65) Prior Publication Data

US 2020/0216227 A1  Jul. 9, 2020

Related U.S. Application Data

(63) Continuation of application No. PCT/JP2017/034327, filed on Sep. 22, 2017.

(51) Int. Cl.
*B65D 41/04* (2006.01)
*B29C 45/16* (2006.01)
(Continued)

(52) U.S. Cl.
CPC ........ *B65D 41/045* (2013.01); *B29C 45/1671* (2013.01); *B65D 53/04* (2013.01);
(Continued)

(58) Field of Classification Search
CPC .. B65D 41/045; B65D 45/1671; B65D 53/04; B65D 2251/0015; B65D 2251/205; B29L 2031/565
(Continued)

(56) References Cited

U.S. PATENT DOCUMENTS 5,769,255 A  6/1998 Ohmi et al.
10,800,585 B2 * 10/2020 Tsuchiya .............. B29C 43/146
(Continued)

FOREIGN PATENT DOCUMENTS

CN   1119983 A   4/1996
CN   1426930 A   7/2003
(Continued)

OTHER PUBLICATIONS

English translation of International Preliminary Report on Patentability for International Application No. PCT/JP2017/034327 dated Mar. 24, 2020 (8 Pages).
(Continued)

*Primary Examiner* — J. Gregory Pickett
*Assistant Examiner* — Niki M Eloshway
(74) *Attorney, Agent, or Firm* — Harness, Dickey & Pierce, P.L.C.

(57) ABSTRACT

A cap comprises a cap body including a top plate portion and a skirt portion integrally provided with the top plate portion through a corner portion and screwed to a mouth portion of a can container, and a disk-shaped sealing member including a sliding layer which is provided separately from the cap body to face the top plate portion, includes a protrusion portion formed on an outer peripheral side of a portion opposed to the mouth portion when the cap body is screwed with the can container and gradually decreasing in thickness toward an outer peripheral edge, and slides on the top plate portion and a sealing layer which is integrally provided with the sliding layer and seals the mouth portion.

9 Claims, 8 Drawing Sheets

(51) Int. Cl.
  *B65D 53/04* (2006.01)
  *B29L 31/56* (2006.01)

(52) U.S. Cl.
  CPC . *B29L 2031/565* (2013.01); *B65D 2251/0015* (2013.01); *B65D 2251/205* (2013.01)

(58) Field of Classification Search
  USPC ........................................................ 220/304
  See application file for complete search history.

(56) References Cited

U.S. PATENT DOCUMENTS

| | | | |
|---|---|---|---|
| 2003/0098286 A1* | 5/2003 | Bloom | B29C 70/80 |
| | | | 215/349 |
| 2004/0060894 A1* | 4/2004 | Parrinello | B65D 53/04 |
| | | | 215/349 |
| 2006/0169665 A1* | 8/2006 | Matukawa | B65D 51/1688 |
| | | | 215/343 |
| 2007/0034593 A1* | 2/2007 | Ichimura | B65D 41/348 |
| | | | 215/349 |
| 2010/0065528 A1* | 3/2010 | Hanafusa | B65D 41/045 |
| | | | 215/349 |
| 2014/0158688 A1 | 6/2014 | Loughrin et al. | |
| 2016/0207255 A1 | 7/2016 | Chang | |
| 2017/0036825 A1 | 2/2017 | Kitano et al. | |
| 2017/0137188 A1* | 5/2017 | Tsuchiya | B65D 53/06 |
| 2019/0248090 A1 | 8/2019 | Fujishige et al. | |
| 2022/0073242 A1* | 3/2022 | Lee | B65D 51/145 |

FOREIGN PATENT DOCUMENTS

| | | |
|---|---|---|
| CN | 103648922 A | 3/2014 |
| CN | 106470915 A | 3/2017 |
| JP | 2003275278 A | 9/2003 |
| JP | 2004217295 A | 8/2004 |
| JP | 2006095694 A | 4/2006 |
| JP | 2014101149 A | 6/2014 |
| JP | 2015143116 A | 8/2015 |
| JP | 2016026961 A | 2/2016 |
| JP | 2016508770 A | 3/2016 |
| JP | 2017178421 A | 10/2017 |
| JP | 2017178427 A | 10/2017 |
| TW | M538917 U | 4/2017 |
| WO | 2006068230 A1 | 6/2006 |
| WO | WO-2015060555 A1 | 4/2015 |
| WO | WO-2015159809 A1 | 10/2015 |

OTHER PUBLICATIONS

Office Action regarding Chinese Patent Application No. 201780095027.5 (with English Translation), dated Jan. 5, 2021.
Taiwanese Office Action for Taiwanese Application No. 106133056 with English translation dated Feb. 5, 2021 (9 pages).
Japanese Office Action for Application No. 2020-109629 (with English translation) dated Jun. 15, 2021 (11 pages).
First Japanese Office Action of Patent Application No. 2016-071801 dated Dec. 3, 2019 with English translation (5 pages).
International Search Report for Application No. PCT/JP2017/034327 dated Dec. 12, 2017 with English Translation (5 pages).
Taiwanese Office Action for Application No. 106133056 dated Jun. 23, 2021 with English Translation (14 pages).

* cited by examiner

CAP, MOLD AND MANUFACTURING METHOD OF CAP

CROSS-REFERENCE TO RELATED APPLICATIONS

This is a Continuation Application of PCT application No. PCT/JP2017/034327, filed Sep. 22, 2017, which was published under PCT Article 21(2) in Japanese.

BACKGROUND

Field

The present invention relates to a cap which closes a can container, a mold, and a manufacturing method of the cap.

Description of the Related Art

Conventionally, a cap which seals a mouth portion of a can container has used a structure in which a sealing member made of a resin material in close contact with the mouth portion is provided on an inner surface of a cap body. In such a cap, a technique in which a cap body and a sealing member are not bonded so as to reduce opening torque at the time of opening a cap is known (see, for example, Jpn. Pat. Appln. KOKAI Publication No. 2004-217295).

Jpn. Pat. Appln. KOKAI Publication No. 2004-217295 discloses a configuration in which a liner serving as a sealing member has a support layer facing a top surface portion of a cap body and a functional layer in close contact with a mouth portion of a container. Jpn. Pat. Appln. KOKAI Publication No. 2004-217295 also discloses a technique of forming a liner by cutting into a predetermined shape a laminated sheet material obtained by laminating a support layer and a functional layer in a bonded state by co-extrusion molding.

BRIEF SUMMARY OF THE INVENTION

The sealing member described above has the following problems. That is, when the sealing member is manufactured by the above method, equipment for cutting the liner from the laminated sheet material and equipment for transporting the cut liner are required. Moreover, there is a problem wherein the laminated sheet material from which the liner has been cut is discarded, which results in poor yield.

For example, a method in which a molten resin material is supplied into the cap body and the resin material is molded into a predetermined sealing member shape using a mold is also conceivable. However, when the sealing member is molded in the cap body, even if the support layer is molded to have a diameter equal to an inner diameter of the cap body, a gap is generated between the cap body and the support layer because the molded support layer shrinks after the molding. Thereafter, when the functional layer is molded from above the support layer, there is a concern that the resin constituting the functional layer may enter the gap between the cap body and the support layer over the support layer.

Since the functional layer for sealing a bottle mouth is softer than the support layer, there is a problem wherein opening torque increases when the functional layer that has entered the gap comes into contact with the cap body.

Then, an object of this invention is to provide a cap which can reduce opening torque, a mold, and a manufacturing method of the cap.

In order to solve the above problem and achieve the object, the cap, the mold, and the manufacturing method of the cap of the present invention are configured as follows.

According to one aspect of the present invention, a cap includes a cap body including a top plate portion and a skirt portion integrally provided with the top plate portion through a curved corner portion having an annular shape, and screwed to a mouth portion of a can container, and a disk-shaped sealing member including a sliding layer which is provided separately from the cap body to face the top plate portion, slides on the top plate portion, and includes a protrusion portion formed on an outer peripheral side of a portion opposed to the mouth portion when the cap body is screwed to the can container and gradually decreasing in thickness toward an outer peripheral edge, and a sealing layer which is integrally provided with the sliding layer and seals the mouth portion.

According to one aspect of the present invention, a mold comprises a lower mold including a recess formed in a same shape as an outer shape of a top plate portion of a molded product constituting a cap body formed with the top plate portion and a skirt portion integrally provided with the top plate portion through a curved corner portion having an annular shape and an outer shape of at least a part of the corner portion, a first upper mold which has an outer diameter equal to an inner diameter of the skirt portion, includes a flat chamfered portion at a ridge portion between an end surface and an outer peripheral surface, and molds a sliding layer of a sealing member provided separately from the cap body, and a second upper mold which has an outer diameter equal to the inner diameter of the skirt portion, includes an end surface facing the lower mold, and molds a sealing layer of the sealing member.

According to one aspect of the present invention a manufacturing method of a cap, comprising arranging a molded product in a recess of a lower mold, the molded product constituting a cap body formed with a top plate portion and a skirt portion integrally provided with the top plate portion through a curved corner portion having an annular shape, and the recess formed in a same shape as an outer shape of the top plate portion of the molded product and an outer shape of at least a part of the corner portion, supplying a first resin material to the top plate portion, molding the first resin material by a first upper mold having an outer diameter equal to an inner diameter of the skirt portion and including a flat chamfered portion at a ridge portion between an end surface and an outer peripheral surface to form a sliding layer of a sealing member provided separately from the cap body, supplying a second resin material to the sliding layer, and molding the second resin material by a second upper mold having an outer diameter equal to the inner diameter of the skirt portion and including an end surface facing the lower mold to form a sealing layer on the sliding layer.

DETAILED DESCRIPTION

Hereinafter, a configuration of a cap 1 according to the first embodiment of the present invention, a manufacturing method of the cap 1, and a mold 200 used for manufacturing the cap 1 will be described with reference to FIGS. 1 to 8.

Figure 1:
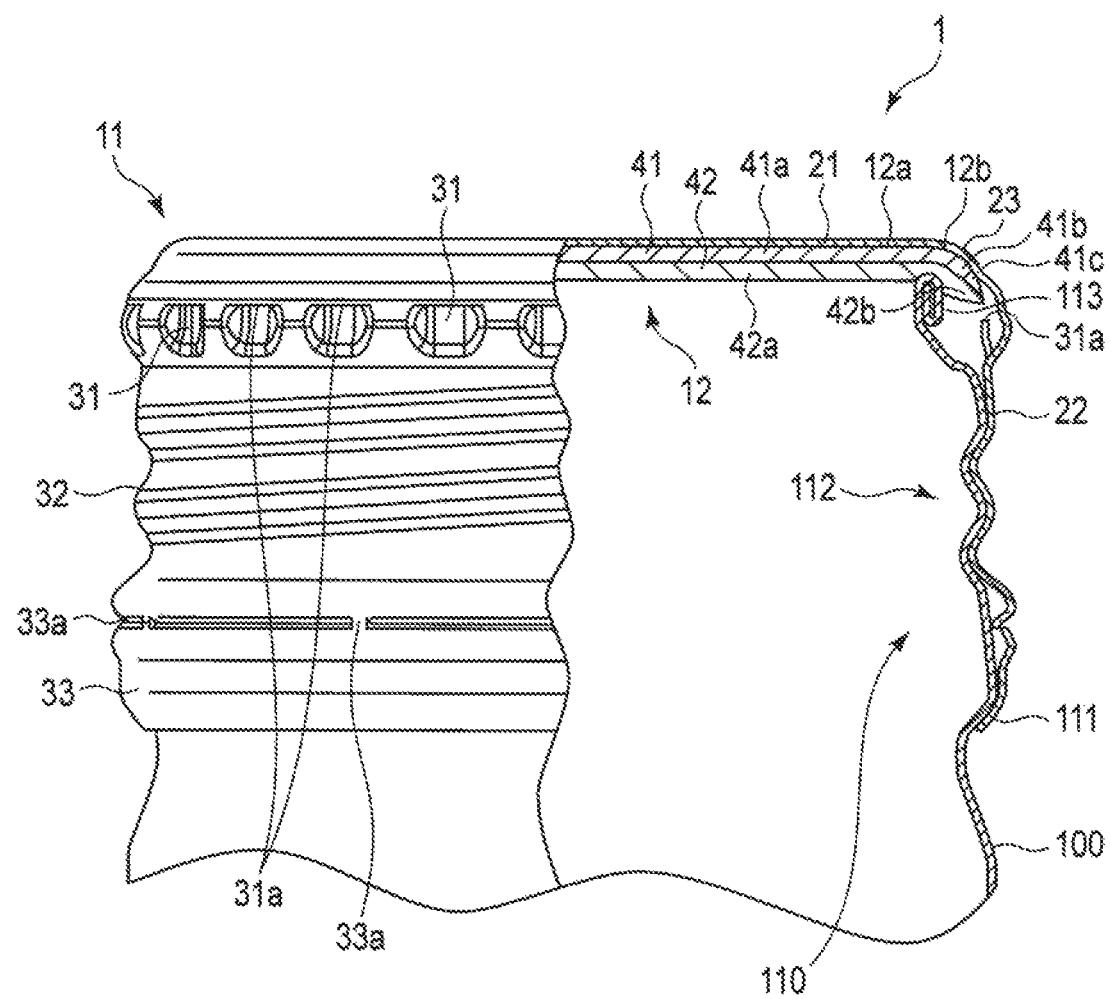
FIG. 1 is a partially cross-sectional side view schematically illustrating a configuration of a cap used in a can container according to a first embodiment of the present invention.
Figure 2:
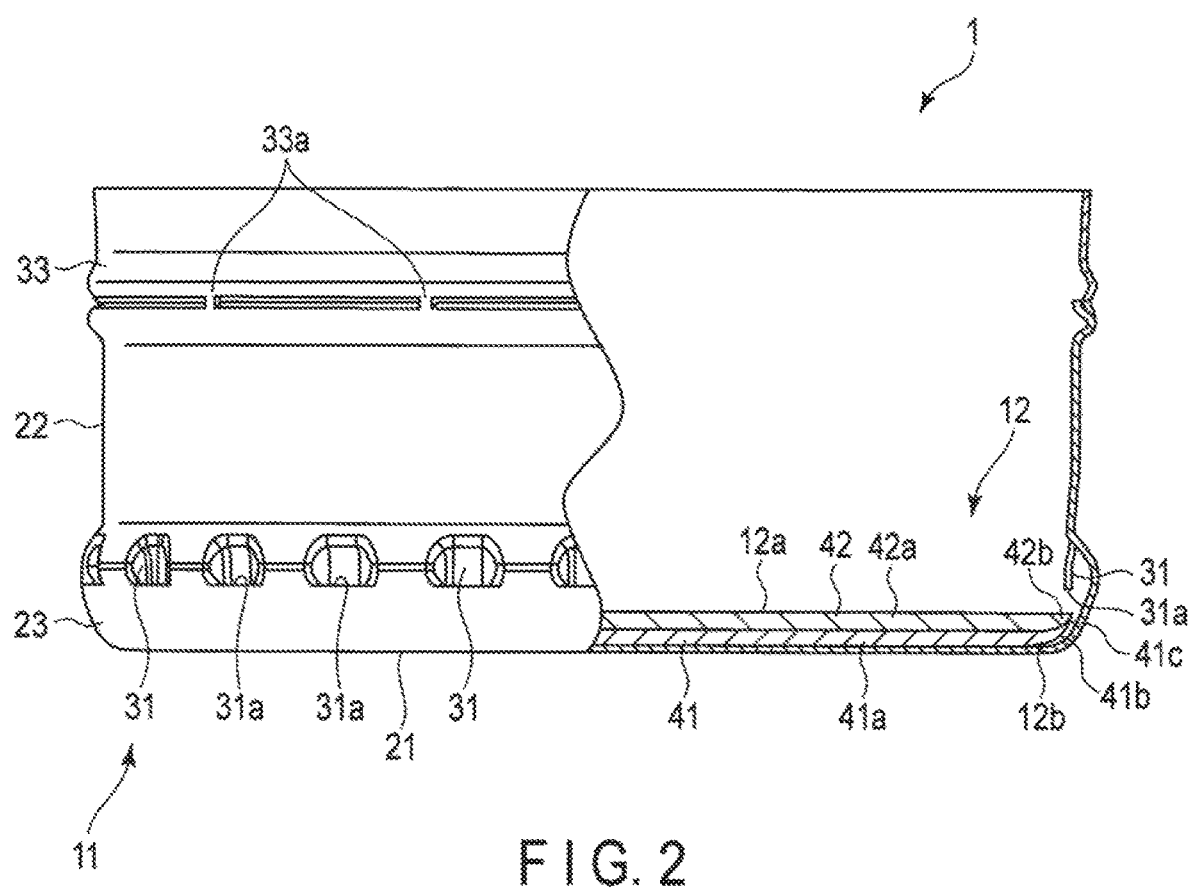
FIG. 2 is a partially cross-sectional side view schematically illustrating the configuration of the cap.
Figure 3:
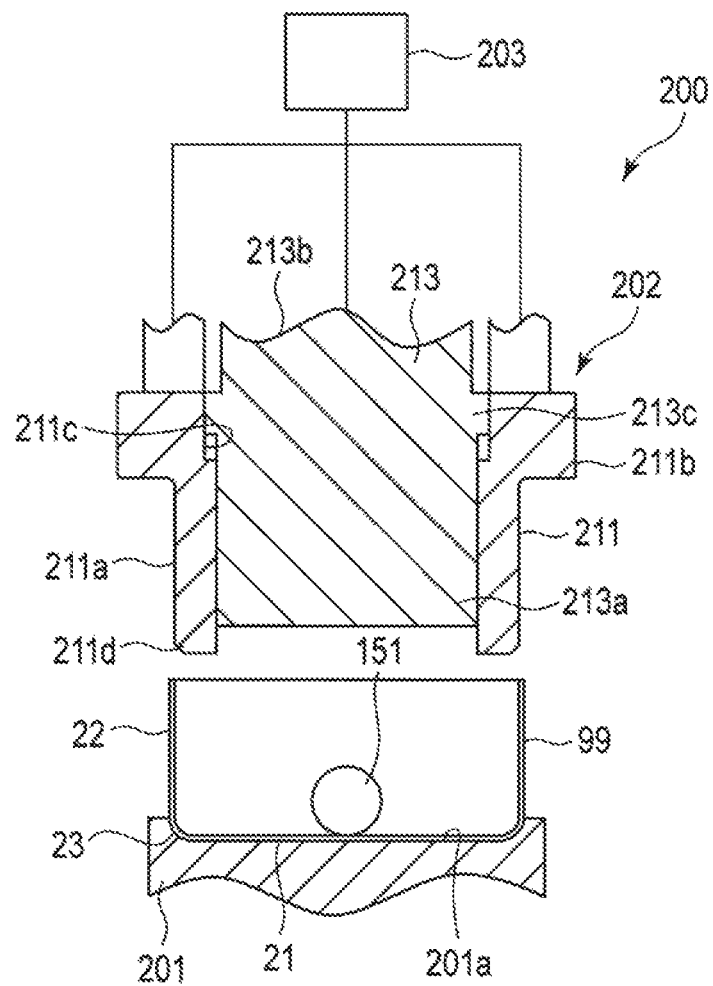
FIG. 3 is an explanatory view illustrating one step of a first step of a manufacturing method of the cap.
Figure 4:
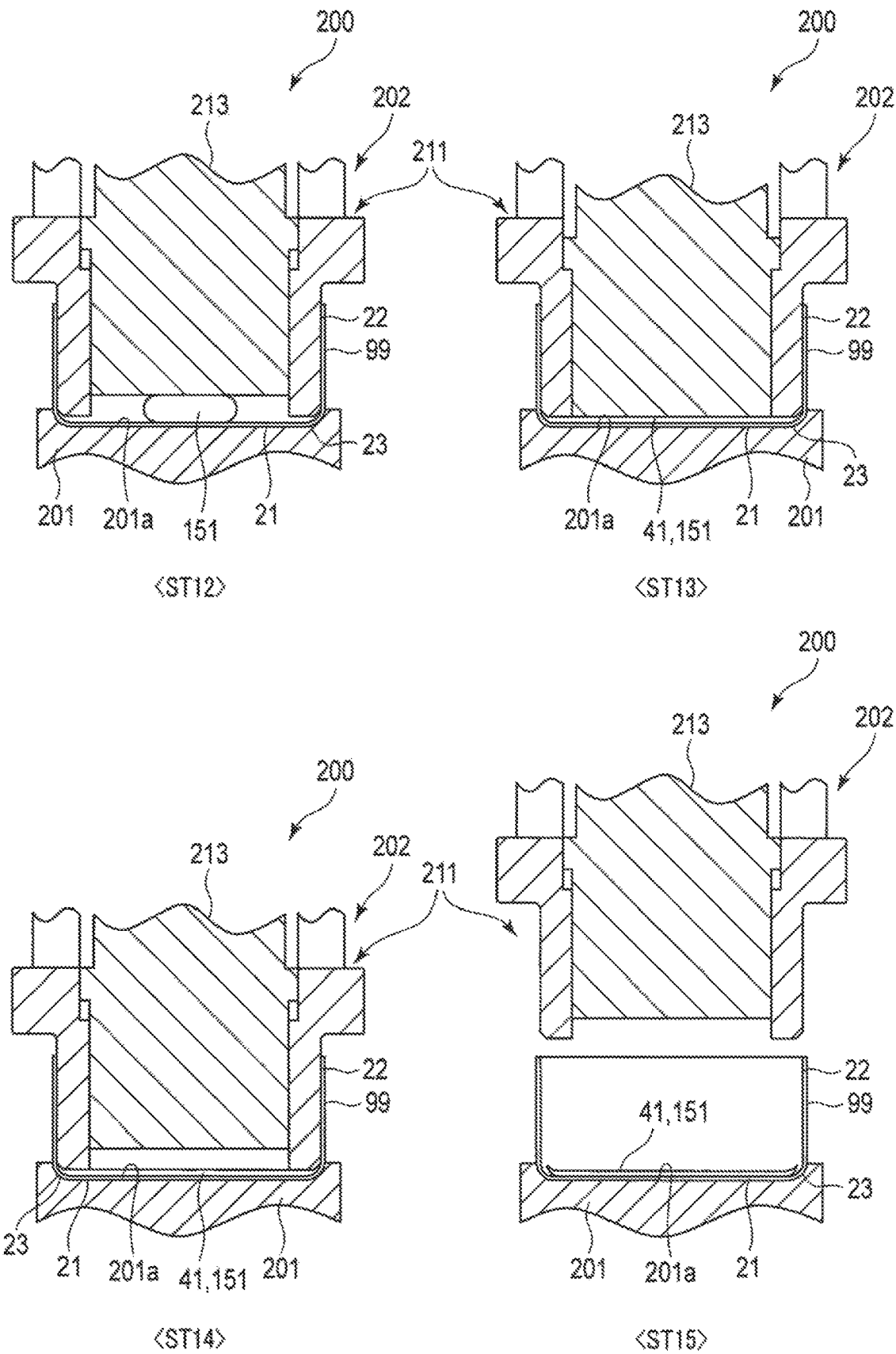
FIG. 4 is an explanatory view illustrating another step of the first step of the manufacturing method of the cap.
Figure 5:
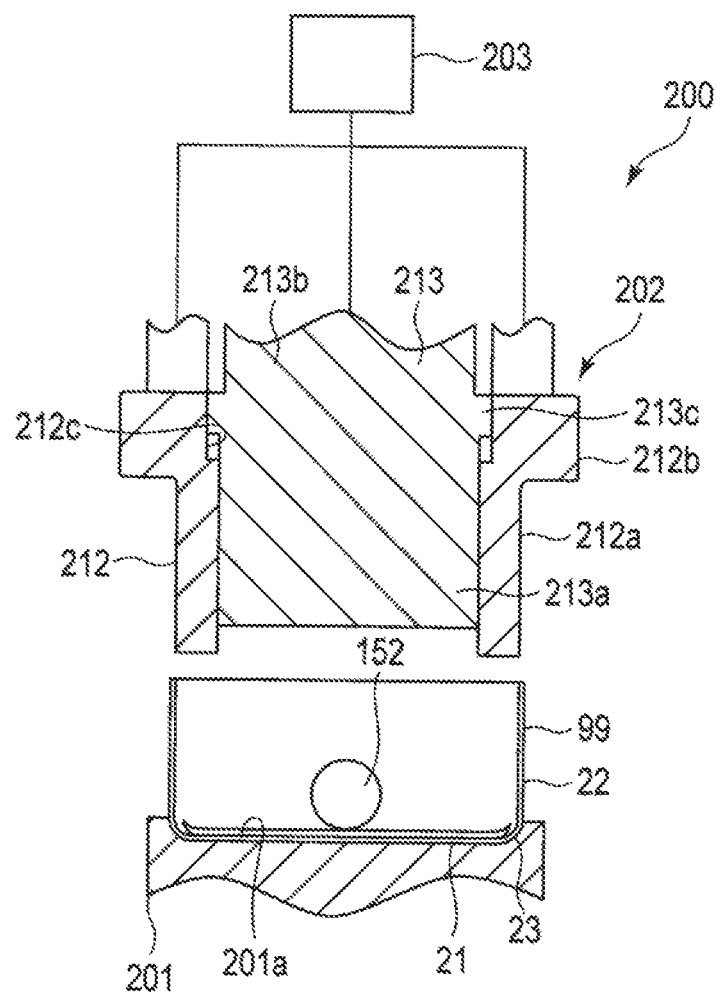
FIG. 5 is an explanatory view illustrating one step of a second step of the manufacturing method of the cap.
Figure 6:
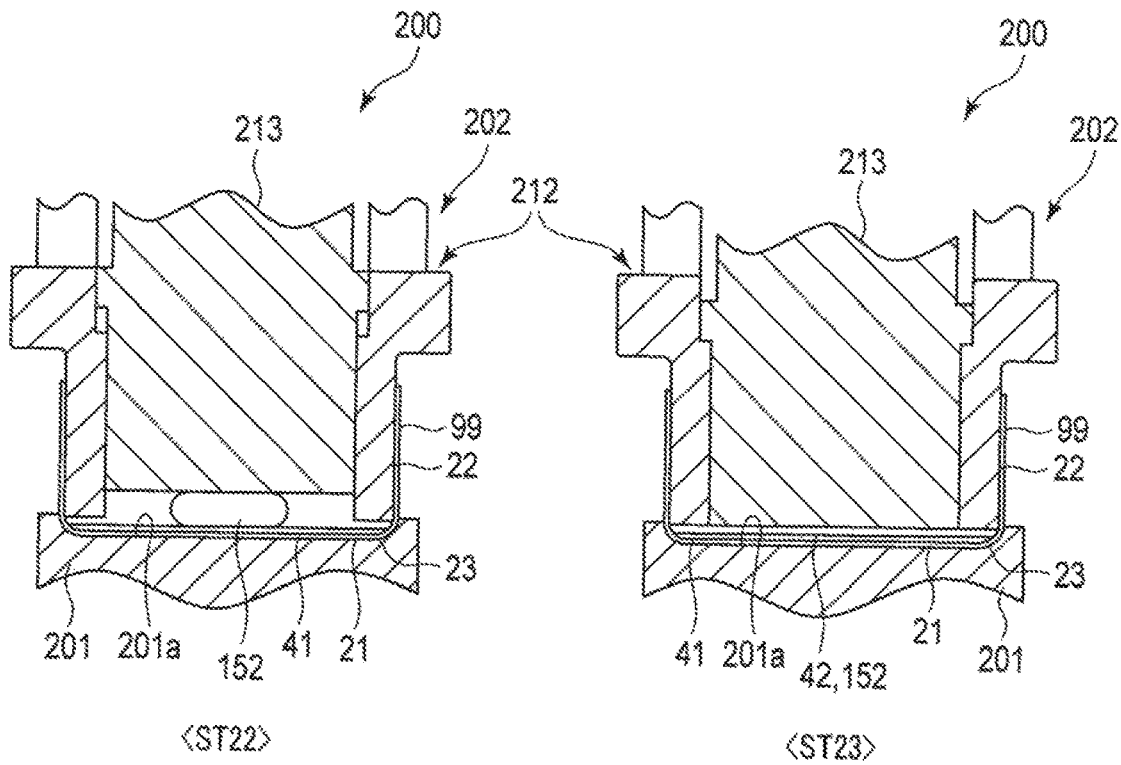
FIG. 6 is an explanatory view illustrating another step of the second step of the manufacturing method of the cap.
Figure 7:
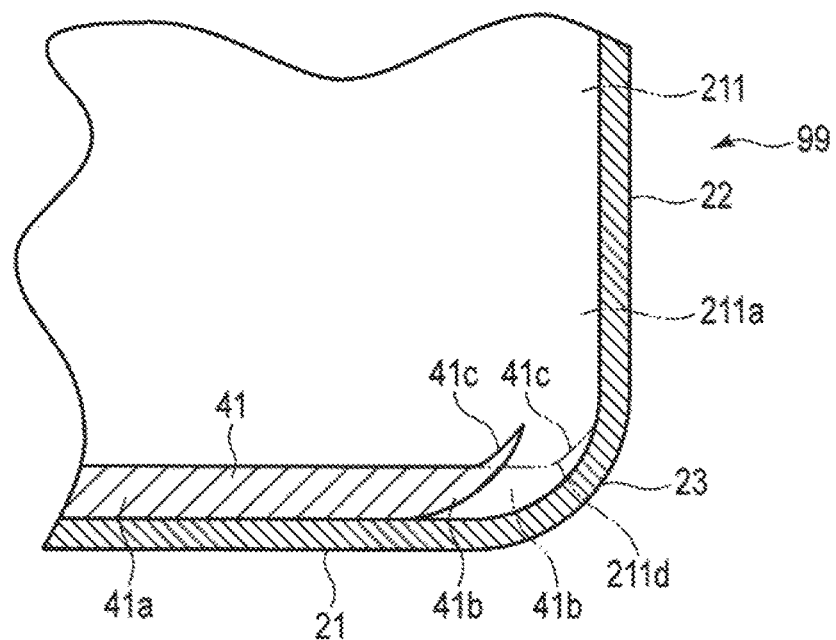
FIG. 7 is a cross-sectional view schematically illustrating a configuration of essential parts in a sealing member in the first step of the cap.
Figure 8:
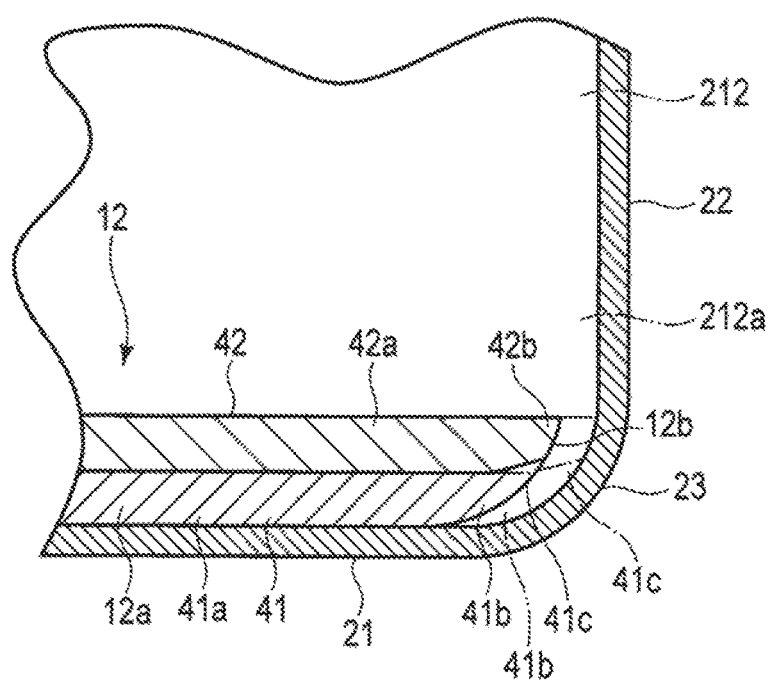
FIG. 8 is a cross-sectional view schematically illustrating a configuration of essential parts in the sealing member in the second step of the cap.

FIG. 1 is a partially cross-sectional side view schematically illustrating a configuration of the cap 1 used in a can container 100 according to the first embodiment of the present invention. FIG. 2 is a partially cross-sectional side view schematically illustrating the configuration of the cap 1. FIG. 3 is an explanatory view illustrating one step of a first step of a manufacturing method of the cap 1 and a configuration of the mold 200. FIG. 4 is an explanatory view illustrating another step of the first step of the manufacturing method of the cap 1. FIG. 5 is an explanatory view illustrating a configuration of the mold 200 in one step of the second step of the manufacturing method of the cap 1. FIG. 6 is an explanatory view illustrating another step of the second step of the manufacturing method of the cap 1. FIG. 7 is a cross-sectional view schematically illustrating a configuration of a sliding layer 41 of a sealing member 12 in the first step of the cap 1. FIG. 8 is a cross-sectional view schematically illustrating configurations of the sliding layer 41 and a sealing layer 42 of the sealing member 12 in the second step of the cap 1. In FIGS. 1 and 2, for explanation purpose, the cross-sectional configuration of the cap 1 shows only a cross-sectional portion, and a configuration in a side view is omitted.

As illustrated in FIG. 1, the cap 1 can seal a mouth portion 110 by being tightly screwed down, molded, and fixed in a situation of capping the mouth portion 110 of the can container 100.

Here, the can container 100 is a so-called bottle type container which stores a beverage or the like. For example, the can container 100 is made of a metal material such as an aluminum alloy or a surface-treated steel plate having resin films laminated on both sides. The can container 100 is formed in a cylindrical shape having different outer diameters, one end portion of which is reduced in diameter. The can container 100 includes the mouth portion 110 at one end portion so as to discharge the stored beverage. The mouth portion 110 includes a jaw portion 111, a male thread portion 112, and a curl portion 113 on an outer peripheral surface thereof from the bottom surface side to the end portion of the can container 100.

The jaw portion 111 is formed by protruding in an annular shape. The curl portion 113 is formed to be smaller in diameter than the male thread portion 112. In addition, the outer diameter of the curl portion 113 is formed to be smaller than an inner diameter of the cap 1. The curl portion 113 is formed by folding the end portion of the mouth portion 110 one or more times. The curl portion 113 constitutes an opening portion for discharging the beverage stored in the can container 100.

The cap 1 includes a cap body 11 and a sealing member 12 provided separately in the cap body 11.

The cap body 11 is made of a material in which a resin coating layer is formed on a metal material such as an aluminum alloy. The cap body 11 is formed by performing each molding such as drawing said material having a thin-walled flat plate shape into a cup shape, knurling molding, and roll-on molding.

The cap body 11 includes a disk-shaped top plate portion 21 and a cylindrical skirt portion 22 integrally provided on a peripheral edge portion of the top plate portion 21. In the cap body 11, the top plate portion 21 and the skirt portion 22 are integrally and continuously formed by a corner portion 23 having an annular shape and a curved shape.

The top plate portion 21 is formed in a disk shape, and the main surface of the top plate portion 21 is formed in a flat surface. One end of the skirt portion 22 is continuous with the top plate portion 21 through the corner portion 23, and the other end of the skirt portion 22 is opened. The skirt portion 22 includes a plurality of knurl portions 31 each having a vent slit 31*a*, a female thread portion 32, and a tamper evidence band portion 33 from the end portion on the top plate portion 21 side to the open end portion.

The knurl portions 31, the female thread portion 32, and the tamper evidence band portion 33 are formed by molding the cup-shaped molded product 99 composed by processing such as knurling molding or roll-on molding, the cup-shaped molded product being composed of the top plate portion 21, the cylindrical skirt portion 22 in which the knurl portions 31, the female thread portion 32, and the tamper evidence band portion 33 are not molded, and the corner portion 23.

The knurl portion 31 has the vent slit 31*a* and protrudes from the inner peripheral surface of the skirt portion 22. The female thread portion 32 is formed to be screwed together with the male thread portion 112 of the can container 100. The tamper evidence band portion 33 is engaged with the jaw portion 111 of the can container 100 in a direction in which the cap 1 separates from the can container 100 and in an axial direction of the cap 1. In addition, the tamper evidence band portion 33 has break portions 33*a* which break off when the cap 1 is opened so that the tamper evidence portion 33 is detached from the skirt portion 22.

The sealing member 12 is formed separately from the cap body 11. The sealing member 12 is formed in a disk shape having an outer diameter larger than a diameter of an inscribed circle of the knurl portions 31 provided in the skirt portion 22 of the cap body 11. The sealing member 12 is integrally provided in the cap body 11 by engaging in the axial direction of the cap body 11 with the vent slits 31*a* of the knurl portions 31 protruding in the radial direction from the inner peripheral surface of the skirt portion 22.

The sealing member 12 includes a disk-shaped sliding layer 41 and a disk-shaped sealing layer 42 integrally laminated on the sliding layer 41. The sealing member 12 is formed by integrally molding the sliding layer 41 and the sealing layer 42 with different resin materials. The sealing member 12 includes a flat plate portion 12*a* having a uniform thickness, and a curved surface portion 12*b*, an outer surface on the top plate portion 21 side of an outer peripheral edge of which is formed with a curved surface. In other words, the sealing member 12 is formed in a disk shape, and a ridge portion on the top plate portion 21 side is a curved surface having a predetermined curvature.

The sliding layer 41 is made of a resin material having a relatively higher (harder) hardness. In addition, the sliding layer 41 is made of a resin material having no adhesion and viscosity with the resin coating layer of the cap body 11. That is, the sliding layer 41 is not bonded to the top plate portion 21, and slides on the top plate portion 21 in a state of being in contact with the top plate portion 21.

The resin material used for the sliding layer 41 includes an olefin-based resin such as a polypropylene resin or a polyethylene resin, a polyester-based resin such as polyethylene terephthalate, a styrene resin, an acryl-based resin, and the like. In the present embodiment, the sliding layer 41 is made of, for example, a polypropylene resin. Note that a pigment, a lubricant, a softener, or the like can be appropriately added to the resin material used for the sliding layer 41.

The sliding layer 41 faces the top plate portion 21 of the cap body 11, and is provided separately from the cap body 11. Due to the resin material used, the sliding layer 41 can be slid on the top plate portion 21 of the cap body 11. The sliding layer 41 is formed in a disk shape. An outer diameter of the sliding layer 41 is smaller than the inner diameter of the skirt portion 22, substantially the same diameter as the inscribed circle of the knurl portions 31 or slightly smaller than the inscribed circle of the knurl portions 31, and larger than an outer diameter of the curl portion 113 of the mouth portion 110.

The sliding layer 41 includes a first flat plate portion 41a having a uniform thickness, a first curved surface portion 41b, an outer surface on the top plate portion 21 side of an outer peripheral edge of which is a curved surface, and a protrusion portion 41c provided on the sealing layer 42 side of the first curved surface portion 41b. The first flat plate portion 41a is formed so that the thickness of a portion from the center of the sliding layer 41 to an outer peripheral side of a portion facing the curl portion 113 of the mouth portion 110 is uniform.

The first curved surface portion 41b is formed so that the thickness of a portion from the outer peripheral side of the portion facing the curl portion 113 of the mouth portion 110 to the outer peripheral edge gradually decreases toward the outer peripheral edge. The protrusion portion 41c is formed in an annular protruding shape that is inclined with respect to the axial direction of the sliding layer 41 and the surface direction of the top plate portion 21 and is curved or inclined toward the open end portion side of the skirt portion 22. The protrusion portion 41c gradually decreases in thickness from the first curved surface portion 41b to the tip end.

The sealing layer 42 is made of a resin material having a relatively low (soft) hardness, and softer than the sliding layer 41. Examples of the resin material used for the sealing layer 42 include an olefin-based resin, a polyester-based resin, a styrene-based resin, and an acryl-based resin, and more preferably, a blend material of a styrene-based elastomer and a polypropylene resin, a blend material of a low-density polyethylene and styrene-based elastomer, and a polyester-based elastomer. In the present embodiment, the sealing layer 42 is made of, for example, a mixed material of a styrene-based elastomer and a polypropylene resin. Note that a pigment, a lubricant, a softener, or the like can be appropriately added to the resin material used for the sealing layer 42.

The sealing layer 42 is integrally provided on the main surface of the sliding layer 41 on the side facing the mouth portion 110. The sealing layer 42 is formed in a disk shape. An outer diameter of the sealing layer 42 is smaller than the inner diameter of the skirt portion 22, substantially the same diameter as the inscribed circle of the knurl portions 31 or slightly larger than the inscribed circle of the knurl portions 31, and larger than the outer diameter of the curl portion 113 of the mouth portion 110. That is, the outer diameter of the sealing layer 42 is equal to the outer diameter of the sliding layer 41 or larger than the outer diameter of the sliding layer 41.

The sealing layer 42 includes a second flat plate portion 42a having a uniform thickness, and a second curved surface portion 42b, an outer surface on the top plate portion 21 side of an outer peripheral edge of which is a curved surface. The second flat plate portion 42a is formed so that the main surface facing the curl portion 113 is formed in a flat surface. The second flat plate portion 42a is formed so that the thickness of a portion from the center of the sealing layer 42 to an outer peripheral side of a portion facing the curl portion 113 of the mouth portion 110 is uniform. For example, the second flat plate portion 42a has the same diameter as the first flat plate portion 41a of the sliding layer 41.

The second flat plate portion 42a constitutes the flat plate portion 12a of the sealing member 12 together with the first flat plate portion 41a. Note that, in the present embodiment, the first flat plate portion 41a and the second flat plate portion 42a are set to have the same thickness.

The second curved surface portion 42b has, for example, a main surface flush with the main surface of the second flat plate portion 42a facing the curl portion 113. The second curved surface portion 42b is formed so that the thickness of the portion from the outer peripheral side of the portion facing the curl portion 113 of the mouth portion 110 to the outer peripheral edge gradually decreases toward the outer peripheral edge. The second curved surface portion 42b is laminated on the first curved surface portion 41b and the protrusion portion 41c. The second curved surface portion 42b forms the curved surface portion 12b of the sealing member 12 together with the first curved surface portion 41b and the protrusion portion 41c.

The sliding layer 41 and the sealing layer 42 are formed so that the first curved surface portion 41b, the protrusion portion 41c, and the second curved surface portion 42b are thinner than the first flat plate portion 41a and the second flat plate portion 42a, respectively.

Next, a mold 200 for manufacturing the sealing member 12 of the cap 1 will be described.

As illustrated in FIGS. 3 and 5, the mold 200 includes a lower mold 201, an upper mold 202 which is movable in one direction with respect to the lower mold 201, and a driving device 203 connected to the upper mold 202 to move the upper mold 202. In FIGS. 3 to 6, the configuration and detailed reference numerals of the mold 200 are shown only in FIGS. 3 and 5, and the driving device 203 and detailed reference numerals are omitted in FIGS. 4 and 6.

The lower mold 201 can hold the molded product 99 of the cap body 11 during molding. The lower mold 201 has a recess 201a which holds the molded product 99.

The recess 201a is formed to support an outer surface of the top plate portion 21 of the molded product 99 and at least a part of an outer peripheral surface of the corner portion 23. In other words, the recess 201a has the same shape as a part of an outer shape of the top plate portion 21 of the molded product 99 and a part of an outer shape of the corner portion 23.

Note that the depth of the recess 201a, in other words, at least the height from an upper surface of the lower mold 201 to a bottom surface of the recess 201a may be equal to a sum of the thickness of the top plate portion 21 and the thickness of the sealing member 12. For this reason, the recess 201a may have the same shape as the outer shape of the top plate portion 21, the outer shape of the corner portion 23, and a part of an outer shape of the skirt portion 22.

The upper mold 202 includes a first upper mold 211 which molds the sliding layer 41 of the sealing member 12, a second upper mold 212 which molds the sealing layer 42 of the sealing member 12, and a movable mold 213 used for each of the first upper mold 211 and the second upper mold 212. The upper mold 202 is a mold that can be moved by the driving device 203.

In the upper mold 202, the first upper mold 211 and the movable mold 213 are used when molding the sliding layer 41, and the second upper mold 212 and the movable mold 213 are used when molding the sealing layer 42.

The first upper mold 211 includes a cylindrical first molding portion 211a, a first attachment portion 211b provided on an outer peripheral surface on the other end side of the first molding portion 211a, and a first regulating portion 211c provided on an inner peripheral surface on the other end side of the first molding portion 211a. The first upper mold 211 is movable from a position where an end surface of the first molding portion 211a is separated from the molded product 99 arranged in the lower mold 201 to a position which is separated from an inner surface of the top plate portion 21 of the molded product 99 by the same distance as the thickness of the sliding layer 41.

The first molding portion 211a has a flat tip end surface. The first molding portion 211a has a chamfered portion 211d at a ridge portion on one end side of the first molding portion 211a opposed to the lower mold 201. The outer diameter of the first molding portion 211a is equal to the inner diameter of the skirt portion 22 or slightly smaller to the extent that no resin material flows in. Note that, here, the slightly smaller diameter to the extent that no resin material flows in is appropriately determined according to various conditions such as viscosity, temperature, and pressure of the resin material to be used. That is, the slightly smaller diameter to the extent that no resin material flows in refers to a diameter capable of obtaining a clearance to the extent that inflow of the resin material between the first molding portion 211a and the skirt portion 22 can be prevented when the resin material is pressed by the mold 200. The chamfered portion 211d is provided at the ridge portion between the end surface facing the lower mold 201 and an outer peripheral surface of the first molding portion 211a. The chamfered portion 211d is an annular flat surface.

The first attachment portion 211b is provided on the outer peripheral surface on the other end side of the first molding portion 211a. The first attachment portion 211b is connected to the driving device 203. The first regulating portion 211c can regulate the amount of movement of the movable mold 213. The first regulating portion 211c regulates the amount of movement of the movable mold 213 by, for example, an end surface formed by forming an inner diameter of the other end side of the first molding portion 211a to be larger than inner diameters of the other portions of the first molding portion 211a.

The second upper mold 212 includes a cylindrical second molding portion 212a having a planar end surface on one end side facing the lower mold 201, a second attachment portion 212b provided on an outer peripheral surface on the other end side of the second molding portion 212a, and a second regulating portion 212c provided on an inner peripheral surface on the other end side of the second molding portion 212a. The second upper mold 212 is movable from a position where an end surface of the second molding portion 212a is separated from the molded product 99 arranged in the lower mold 201 to a position which is separated from the inner surface of the top plate portion 21 of the molded product 99 by the same distance as a sum of the thickness of the sliding layer 41 and the thickness of the sealing layer 42.

The second molding portion 212a is formed in a cylindrical shape in which a ridge portion between the end surface on one end side and an outer peripheral surface is not chamfered. In other words, the second upper mold 212 does not have the chamfered portion 211d of the first molding portion 211a of the first upper mold 211. The second molding portion 212a has a flat tip end surface. The outer diameter of the second molding portion 212a is the same as the inner diameter of the skirt portion 22 or slightly smaller to the extent that no resin material flows in. Note that, here, the slightly smaller diameter to the extent that no resin material flows in is appropriately determined according to various conditions such as viscosity, temperature, and pressure of the resin material to be used. That is, the slightly smaller diameter to the extent that no resin material flows in refers to a diameter capable of obtaining a clearance to the extent that inflow of the resin material between the second molding portion 212a and the skirt portion 22 can be prevented when the resin material is pressed by the mold 200.

The second attachment portion 212b is provided on an outer peripheral surface on the other end side of the second molding portion 212a. The second attachment portion 212b is connected to the driving device 203. The second regulating portion 212c can regulate the amount of movement of the movable mold 213. The second regulating portion 212c regulates the amount of movement of the movable mold 213 by, for example, an end surface formed by forming an inner diameter of the other end side of the second molding portion 212a to be larger than inner diameters of the other portions of the second molding portion 212a.

The movable mold 213 includes a columnar third molding portion 213a having a planar end surface on one end side facing the lower mold 201, a third attachment portion 213b provided on the other end side of the third molding portion 213a, and a regulated portion 213c provided on an outer peripheral surface on the other end side of the third molding portion 213a.

The third molding portion 213a is formed in a columnar shape, and has an outer diameter equal to the inner diameter of the first molding portion 211a of the first upper mold 211 and an inner diameter of the second molding portion 212a of the second upper mold 212. The third molding portion 213a has a flat tip end surface.

The third attachment portion 213b is connected to the driving device 203. The regulated portion 213c is provided on an outer peripheral surface of the third molding portion 213a at a position where an end surface of the third molding portion 213a is flush with the end surface of the first molding portion 211a or the end surface of the second molding portion 212a when the regulated portion 213c abuts against the first regulating portion 211c of the first upper mold 211 or the second regulating portion 212c of the second upper mold 212.

The driving device 203 can move the first upper mold 211, the second upper mold 212, and the movable mold 213 in one direction with respect to the lower mold 201 within a predetermined distance range. Specifically, the driving device 203 can move the first upper mold 211 along an axial direction of the molded product 99 between a position where the end surface of the first molding portion 211a is separated from the end portion of the skirt portion 22 of the molded product 99 arranged in the lower mold 201 and a position where the end surface of the first molding portion 211a is separated from the inner surface of the top plate portion 21 of the molded product 99 by the same distance as the thickness of the sliding layer 41.

The driving device 203 can move the second upper mold 212 along the axial direction of the molded product 99 between a position where the end surface of the second molding portion 212a is separated from the end surface of the skirt portion 22 of the molded product 99 arranged in the lower mold 201 and a position where the end surface of the second molding portion 212a is separated from the inner surface of the top plate portion 21 of the molded product 99 by the same distance as the sum of the thickness of the sliding layer 41 and the thickness of the sealing layer 42.

The driving device 203 can move the movable mold 213 in the same direction as the moving direction of the first upper mold 211 and the second upper mold 212 in a process different than that for the first upper mold 211 and the second upper mold 212. The driving device 203 includes, for example, a control unit, and drives, by the control unit, the first upper mold 211, the second upper mold 212, and the movable mold 213 by a predetermined operation according to a program stored in advance.

Next, the manufacturing method of the cap 1 using the mold 200 formed as described above will be described with reference to FIGS. 3 to 8.

First, the molded product 99 having the top plate portion 21, the skirt portion 22, and the corner portion 23 is manufactured by drawing into a cup shape a material in which a resin coating layer is formed on a metal material such as an aluminum alloy having a thin-walled flat plate shape.

Next, the molded product 99 is arranged in the recess of the lower mold 201. Subsequently, as the first step, the sliding layer 41 of the sealing member 12 is molded. Specifically, first, as illustrated in step ST11 of FIG. 3, the driving device 203 drives the first upper mold 211 and the movable mold 213 to place the first upper mold 211 and the movable mold 213 at the initial position. Here, the initial position is a position at which the first upper mold 211 is separated from the molded product 99 arranged in the lower mold 201 and the end surface of the movable mold 213 is retracted from the end surface of the first molding portion 211a. Next, a molten first resin material 151 for molding the sliding layer 41 is supplied to the center portion of the top plate portion 21 of the molded product 99 by a supplying device or the like.

Subsequently, as illustrated in step ST12 of FIG. 4, the driving device 203 moves the first upper mold 211 and the movable mold 213 to a position where the end surface of the first molding portion 211a is separated from the inner surface of the top plate portion 21 of the molded product 99 by the same distance as the thickness of the sliding layer 41 while maintaining the state of the initial position.

Thereby, the first upper mold 211 forms a gap between the end surface of the first molding portion 211a and the surface of the top plate portion 21 of the molded product 99 so as to have the thickness of the sliding layer 41. At this time, since the end surface of the movable mold 213 is retracted from the end surface of the first molding portion 211a, the first resin material 151 is pressed by the movable mold 213 to have a shape thicker than the thickness of the sealing layer 41.

Next, as illustrated in step ST13, the driving device 203 moves the movable mold 213 such that the end surface of the movable mold 213 is flush with the end surface of the first molding portion 211a. The regulated portion 213c abuts against the first regulating portion 211c of the first upper mold 211, and the movement of the movable mold 213 is regulated, whereby the end surface of the third molding portion 213a is flush with the end surface of the first molding portion 211a. As a result, the first resin material 151 is pressed by the movable mold 213, fills a gap between the inner surfaces of the top plate portion 21 and the corner portion 23 of the molded product 99 and the end surfaces of the first molding portion 211a and the movable mold 213 as illustrated by a two-dot chain line in FIG. 7, and is compression-molded into approximately the same shape as the sliding layer 41.

That is, the first resin material 151 is molded into the shape of the first flat plate portion 41a by the top plate portion 21, the end surface of the first molding portion 211a, and the end surface of the third molding portion 213a, into the shape of the first curved surface portion 41b by the corner portion 23 and the end surface of the first molding portion 211a, and into the shape of the protrusion portion 41c by the corner portion 23 and the chamfered portion 211d of the first molding portion 211a.

Next, the driving device 203 retracts the movable mold 213 from the molded product 99 as illustrated in step ST14, and then retracts the first upper mold 211 and the movable mold 213 from the molded product 99 as illustrated in step ST15. The compression-molded first resin material 151 is naturally cooled or cooled by a cooling device to solidify the first resin material 151. Note that the cooling of the first resin material 151 causes the first resin material 151 to contract as illustrated by a solid line in FIG. 7, and the molded sliding layer 41 becomes smaller than an inner diameter of the cap body 11. By these first steps, the sliding layer 41 is molded.

Next, as the second step, the sealing layer 42 is formed on the main surface of the sliding layer 41. Specifically, first, as illustrated in step ST21 of FIG. 5, the driving device 203 drives the second upper mold 212 and the movable mold 213 to place the second upper mold 212 and the movable mold 213 at the initial position. Here, the initial position is a position where the second upper mold 212 is separated from the molded product 99 arranged in the lower mold 201 and the end surface of the movable mold 213 is retracted from the end surface of the second molding portion 212a. Next, a molten second resin material 152 for molding the sealing layer 42 is supplied to the center portion of the sliding layer 41 molded on the top plate portion 21 of the molded product 99 by a supplying device or the like.

Subsequently, as illustrated in step ST22 of FIG. 6, the driving device 203 moves the second upper mold 212 and the movable mold 213 to a position where the end surface of the second molding portion 212a is separated from the inner surface of the top plate portion 21 of the molded product 99 by the same distance as the thicknesses of the sliding layer 41 and the sealing layer 42 while maintaining the state of the initial position.

Thereby, the second upper mold 212 forms a gap between the end surface of the second molding portion 212a and the surface of the top plate portion 21 of the molded product 99 so as to have the thickness of the sealing layer 42. At this time, since the end surface of the movable mold 213 is retracted from the end surface of the second molding portion 212a, the second resin material 152 is pressed by the movable mold 213 to have a shape thicker than the thickness of the sealing layer 42.

Next, as illustrated in step ST23, the driving device 203 moves the movable mold 213 such that the end surface of the movable mold 213 is flush with the end surface of the second molding portion 212a. The regulated portion 213c abuts against the second regulating portion 212c of the second upper mold 212, and the movement of the movable mold 213 is regulated, whereby the end surface of the third molding portion 213a is flush with the end surface of the second molding portion 212a. As a result, the second resin material 152 is pressed by the movable mold 213, fills a gap between the inner surfaces of the sliding layer 41 and the corner portion 23 on the top plate portion 21 of the molded product 99 and the end surfaces of the second molding portion 212a and the movable mold 213 as illustrated by a two-dot chain line in FIG. 8, and is compression-molded into approximately the same shape as the sealing layer 42.

At this time, the sliding layer 41 is elastically deformed by the pressure of the second resin material 152 such that the main surface is approximately flat and the protrusion portion 41c slightly protrudes as illustrated by a two-dot chain line in FIG. 8. In particular, since the protrusion portion 41c is formed to be thin, the outer peripheral edge of the sliding layer 41 is deformed so as to be in close contact with the inner surface of the corner portion 23 of the molded product 99. Therefore, the second resin material 152 forming the sealing layer 42 does not enter between the sliding layer 41 and the corner portion 23, and the second resin material 152 is molded above the sliding layer 41.

That is, the second resin material 152 is molded into the shape of the second flat plate portion 42a by the first flat plate portion 41a of the sliding layer 41, the end surface of the second molding portion 212a, and the end surface of the third molding portion 213a, and into the shape of the second curved surface portion 42b by the corner portion 23, the first curved surface portion 41b, the protrusion portion 41c, and the end surface of the second molding portion 212a.

Next, the driving device 203 retracts the movable mold 213 from the molded product 99 as illustrated in step ST24, and then retracts the second upper mold 212 and the movable mold 213 from the molded product 99 as illustrated in step ST25. The compression-molded second resin material 152 is naturally cooled or cooled by a cooling device to solidify the second resin material 152. As illustrated by a solid line in FIG. 8, the sliding layer 41 contracts due to the retraction of the second upper mold 212 and the movable mold 213, and the second resin material 152 contracts due to the cooling of the second resin material 152, so that the molded sealing layer 42 becomes smaller than the inner diameter of the cap body 11. By these second steps, the sealing layer 42 is molded on the sliding layer 41.

By these first and second steps, the sealing member 12 is separately molded in the molded product 99. Next, the sealing member 12 is removed from the molded product 99, and the knurl portions 31 and the tamper evidence band portion 33 are molded on the molded product 99 by knurling molding or the like as illustrated in FIG. 2. Subsequently, the sealing member 12 is inserted into the cap body 11 in which the knurl portions 31 and the tamper evidence band portion 33 are formed, in a state in which a curved surface of the curved surface portion 12b faces the top plate portion 21 side of the cap body 11. Thereby, the cap 1 not attached to the can container 100 is molded.

When the cap 1 is sealed with the can container 100, the can container 100 is filled with a beverage or the like, and covered with the cap 1 so that the sealing layer 42 is brought into close contact with the curl portion 113. Next, by roll-on molding or the like, the female thread portion 32 is molded along the shape of the male thread portion 112 of the can container 100, and the tamper evidence band portion 33 is molded into a shape in which the tamper evidence band portion 33 is engaged with the jaw portion 111. By these steps, the cap 1 is tightly screwed down, molded, and fixed to the mouth portion 110 of the can container 100, and a can product in which the can container 100 is sealed with the cap 1 is manufactured.

According to the cap 1 formed as described above, the sealing member 12 has the thin protrusion portion 41c at the outer peripheral edge of the sliding layer 41. Thereby, when the sealing member 12 is molded from the second resin material 152 in the molded product 99 constituting the cap body 11, the second resin material 152 constituting the sealing layer 42 can be prevented from entering between the sliding layer 41 and the molded product 99.

As a result, in the molded sealing member 12, the second resin material 152 of the sealing layer 42 can be prevented from wrapping around to a side of the sliding layer 41 facing the cap body 11, so that only the sliding layer 41 comes into contact with the cap body 11. It is thus possible to reduce opening torque at the time of an opening operation of removing the cap 1 from the can container 100.

Further, since the sealing member 12 can be molded in the molded product 99 forming the cap body 11, a facility for cutting the sealing member 12 is not required. In addition, the first resin material 151 and the second resin material 152 used for the manufacturing may be in the amounts that constitute the sealing member 12. For this reason, it is possible to reduce the facility cost and manufacturing cost of the sealing member 12.

The sealing member 12 has the curved surface portion 12b on the outer peripheral edge side by being molded in the molded product 99. Therefore, when the sealing member 12 is taken out after the sealing member 12 is molded in the molded product 99 and the sealing member 12 is inserted into the cap body 11 molded thereafter, the curved surface portion 12b guides the insertion of the sealing member 12, so that a high ability to be assembled is achieved.

As described above, in the cap 1 according to the first embodiment of the present invention, by providing the protrusion portion 41c at the outer peripheral edge of the sliding layer 41, it is possible to reduce the opening torque when removing the cap 1 from the can container 100.

Figure 9:
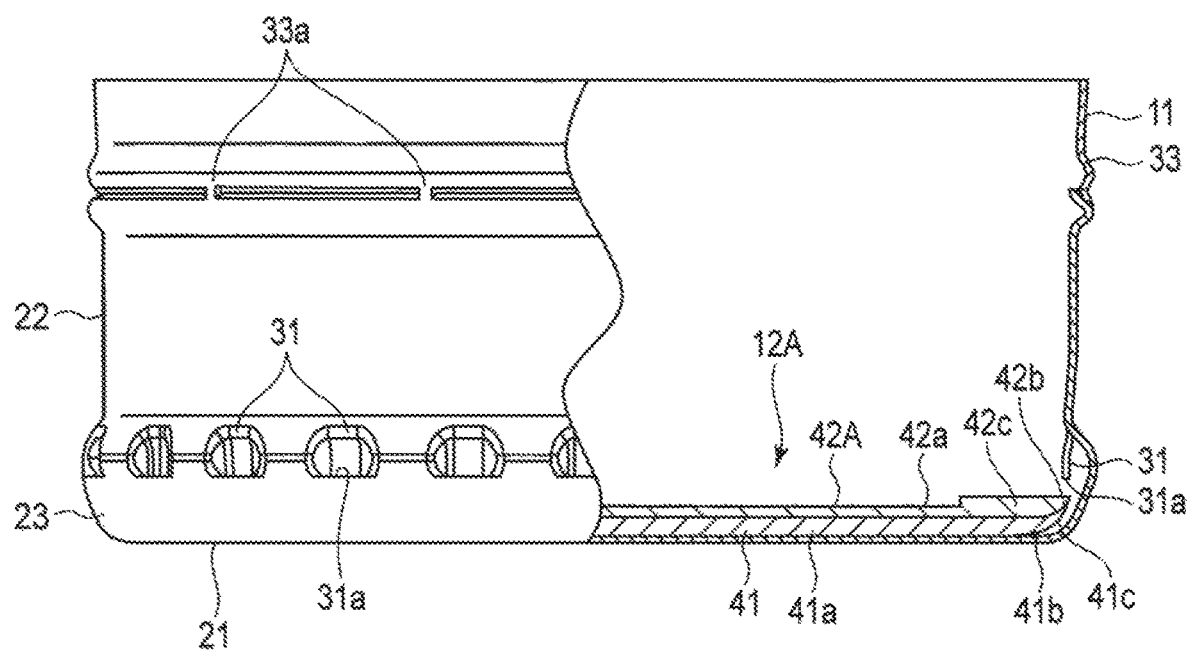
FIG. 9 is a partially cross-sectional side view schematically illustrating a configuration of a cap according to a second embodiment of the present invention.
Figure 10:
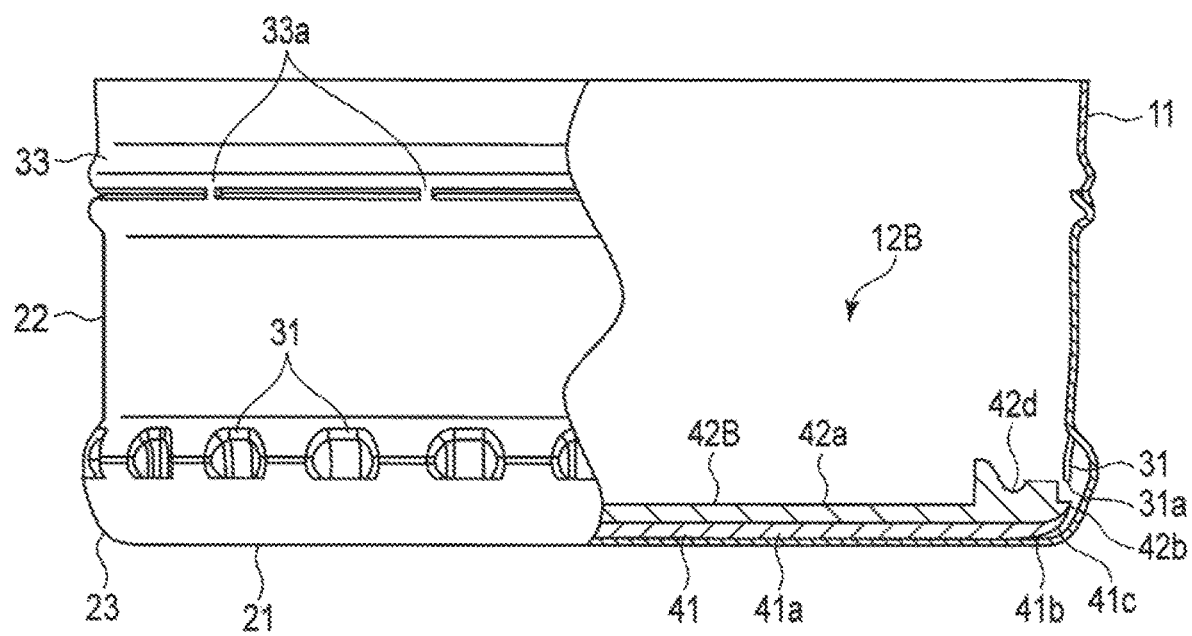
FIG. 10 is a partially cross-sectional side view schematically illustrating a configuration of a cap according to a third embodiment of the present invention.

Note that the present invention is not limited to the embodiment described above. For example, in the above-described example, the sealing member 12 has a configuration in which the main surface of the sealing layer 42 that abuts against the curl portion 113 of the mouth portion 110 of the can container 100 is a flat surface, but the configuration is not limited thereto. For example, as illustrated in a sealing member 12A according to the second embodiment illustrated in FIG. 9, a sealing layer 42A may be formed so that a portion 42c that abuts against the curl portion 113 is thicker than the second flat plate portion 42a. With this configuration, since the thickness of the second flat plate portion 42a can be reduced, the second resin material 152 used for the sealing layer 42A is reduced. As a result, the manufacturing cost of the sealing member 12A can be reduced. In a case of the sealing layer 42A, at the time of manufacturing, the second resin material 152 of the sealing layer 42A may be reduced, and the shape of the second regulating portion 212c may be changed so that the end surface of the movable mold 213 slightly protrudes from the end surface of the second upper mold 212.

Further, for example, as illustrated in a sealing member 12B according to the third embodiment illustrated in FIG.

10, a sealing layer 42B may be formed so that an annular protrusion 42d that abuts against the inner peripheral surface or the outer peripheral surface of the curl portion 113 or both of them is provided in a portion that abuts against the curl portion 113. In a case of such a sealing layer 42B, a recess having the same shape as the protrusion 42d may be provided on the end surface of the second molding portion 212a of the second upper mold 212.

In the above-described example, the sealing member 12 has a configuration in which the sealing layer 42 is integrally laminated on the sliding layer 41, but the configuration is not limited thereto. For example, the sealing member 12 may have a configuration in which an intermediate layer made of another resin material is provided between the sliding layer 41 and the sealing layer 42. In addition, the driving device 203 of the mold 200 is connected to the upper mold 202, but may be connected to the lower mold 201 to move the lower mold 201 to manufacture the sealing member 12.

The present invention is not limited to the above embodiments, and various modifications can be made in the implementation stage without departing from the gist thereof. Moreover, each of the embodiments may be implemented by being suitably combined to a maximum extent, in which case a combined effect will be obtained. Furthermore, the above embodiments include inventions at various stages, and various inventions can be extracted by an appropriate combination of a plurality of disclosed constituent elements.

What is claimed is:

1. A cap comprising:
   a cap body including a top plate portion, and a skirt portion integrally provided with the top plate portion through a curved corner portion having an annular shape, wherein the cap body is screwed to a mouth portion of a can container; and
   a disk-shaped sealing member including a sliding layer which is provided separately from the cap body to face the top plate portion, the siding layer includes a protrusion portion formed on an outer peripheral side of a portion opposed to the mouth portion when the cap body is screwed with the can container, the protrusion portion gradually decreasing in thickness toward an outer peripheral edge, and slides on the top plate portion, the protrusion portion being an annular protruding shape inclined with respect to an axial direction of the sliding layer, and a sealing layer is provided on the surface on the opposite side of the surface facing the top plate portion of the sliding layer including the protrusion portion; and wherein an outer diameter of the sealing layer is either the same as an outer diameter of the sliding layer or larger than an outer diameter of the sliding layer.

2. The cap according to claim 1, wherein an outer peripheral side of the sealing layer than a portion opposed to the mouth portion is thinner than a thickness of the portion opposed to the mouth portion.

3. The cap according to claim 2, wherein the sliding layer includes a flat plate portion formed in a flat plate shape from a center to the outer peripheral side of the portion opposed to the mouth portion, a curved surface portion gradually decreasing in thickness from the outer peripheral side of the portion opposed to the mouth portion toward the outer peripheral edge, and the protrusion portion formed at the outer peripheral edge of a main surface of the curved surface portion on a side of the sealing layer and inclined with respect to an axial direction of the flat plate portion and a surface direction of a main surface of the flat plate portion.

4. A mold comprising:
   a lower mold including a recess formed in a same shape as an outer shape of a top plate portion of a molded product constituting a cap body formed with the top plate portion and a skirt portion integrally provided with the top plate portion through a curved corner portion having an annular shape and an outer shape of at least a part of the corner portion;
   a first upper mold which has an outer diameter equal to an inner diameter of the skirt portion or capable of preventing inflow of a resin material, includes a flat chamfered portion at a ridge portion between an end surface and an outer peripheral surface, and molds a sliding layer of a sealing member provided separately from the cap body, the flat chamfered portion forming a protrusion portion, the protrusion portion being an annular protruding shape inclined with respect to an axial direction of the sliding layer;
   a second upper mold which has an outer diameter equal to the inner diameter of the skirt portion or capable of preventing inflow of a resin material, includes an end surface facing the lower mold, and molds a sealing layer of the sealing member onto and covering at least a portion of the protrusion portion of the sliding layer; and
   wherein an outer diameter of the sealing member is either the same as an outer diameter of the sliding layer or larger than an outer diameter of the sliding layer.

5. The mold according to claim 4, wherein the chamfered portion is provided in the first upper mold to face an outer peripheral side of the top plate portion than a portion opposed to a mouth portion of a can container when the cap body is screwed with the can container.

6. The mold according to claim 4, wherein a depth of the recess is equal to a sum of a thickness of the top plate portion and a thickness of the sealing member.

7. A manufacturing method of a cap, comprising:
   arranging a molded product in a recess of a lower mold, the molded product constituting a cap body formed with a top plate portion and a skirt portion integrally provided with the top plate portion through a curved corner portion having an annular shape, and the recess formed in a same shape as an outer shape of the top plate portion of the molded product and an outer shape of at least a part of the corner portion;
   supplying a first resin material to the top plate portion;
   molding the first resin material by a first upper mold having an outer diameter equal to an inner diameter of the skirt portion and including a flat chamfered portion at a ridge portion between an end surface and an outer peripheral surface to form a sliding layer of a sealing member provided separately from the cap body, the flat chamfered portion forming a protrusion portion, the protrusion portion being an annular protruding shape inclined with respect to an axial direction of the sliding layer;
   supplying a second resin material to the sliding layer;
   molding the second resin material by a second upper mold having an outer diameter equal to the inner diameter of the skirt portion and including an end surface facing the lower mold to form a sealing layer onto and covering at least a portion of the protrusion portion of the sliding layer; and
   wherein an outer diameter of the sealing member is either the same as an outer diameter of the sliding layer or larger than an outer diameter of the sliding layer.

8. The manufacturing method of a cap according to claim 7, wherein the chamfered portion is provided in the first upper mold to face an outer peripheral side of the top plate portion than a portion opposed to a mouth portion of a can container when the cap body is screwed with the can container.

9. The manufacturing method of a cap according to claim 7, wherein a depth of the recess is equal to a sum of a thickness of the top plate portion and a thickness of the sealing member.

\* \* \* \* \*